US012680372B2

(12) United States Patent
Sloss

(10) Patent No.: US 12,680,372 B2
(45) Date of Patent: Jul. 14, 2026

(54) ENCLOSURE SYSTEM

(71) Applicant: Glenn Sloss, Clinton, CT (US)

(72) Inventor: Glenn Sloss, Clinton, CT (US)

( * ) Notice: Subject to any disclaimer, the term of this patent is extended or adjusted under 35 U.S.C. 154(b) by 0 days.

(21) Appl. No.: 18/406,834

(22) Filed: Jan. 8, 2024

(65) Prior Publication Data

US 2025/0223863 A1 Jul. 10, 2025

(51) Int. Cl.

| | |
|---|---|
| ***E06B 1/52*** | (2006.01) |
| ***E05B 65/08*** | (2006.01) |
| ***E05D 15/06*** | (2006.01) |
| ***E05D 15/26*** | (2006.01) |
| *E05C 9/04* | (2006.01) |
| *E06B 3/48* | (2006.01) |

(52) U.S. Cl.

CPC ................ *E06B 1/52* (2013.01); *E05B 65/08* (2013.01); *E05D 15/0652* (2013.01); *E05D 15/26* (2013.01); *E05B 65/0876* (2013.01); *E05B 65/0882* (2013.01); *E05C 9/042* (2013.01); *E05C 9/045* (2013.01); *E06B 3/481* (2013.01)

(58) Field of Classification Search

CPC .............. E05D 15/26; E05D 2015/268; E05D 15/0652; E05D 15/48; E05D 2015/485; E05D 15/264–266; E06B 1/52; E06B 3/921; E06B 3/5072; E05B 65/0876; E05B 65/0882; E05B 65/08; E05C 9/042; E05C 9/045

See application file for complete search history.

(56) References Cited

U.S. PATENT DOCUMENTS

| | | | | | |
|---|---|---|---|---|---|
| 2,959,220 | A * | 11/1960 | Latham | E05D 15/063 | 160/199 |
| 3,295,588 | A * | 1/1967 | Gilson | E06B 7/18 | 160/40 |
| 3,654,732 | A * | 4/1972 | Schacht | E05D 15/58 | 49/127 |
| 3,944,266 | A * | 3/1976 | Weaver | E05B 65/0876 | 292/147 |
| 6,176,041 | B1 * | 1/2001 | Roberts | E05C 9/045 | 70/130 |
| 6,698,491 | B2 * | 3/2004 | Goldsmith | E05D 15/063 | 160/199 |

(Continued)

FOREIGN PATENT DOCUMENTS

| | | | | |
|---|---|---|---|---|
| CN | 107975326 A | * 5/2018 | | E05D 15/48 |
| CN | 108979463 A | * 12/2018 | | E06B 3/5072 |

(Continued)

*Primary Examiner* — Daniel P Cahn
*Assistant Examiner* — Patrick B. Ponciano

(57) ABSTRACT

An enclosure system including a frame to be fastened to a base including a plurality of panels including at least a pair of side panels and a front panel, wherein a height and width of each panel is adjustable to fit the base wherein the front panel includes a plurality of sliding doors, wherein each of the sliding doors moves along a respective designated track, wherein the front panel includes a first locking mechanism configured to allow each of the sliding doors to be locked in a locked position and allow each of the sliding doors to slide out of the frame in an open position, wherein each of the tracks includes a respective moveable section to allow each of the sliding doors to be removed or installed when the respective moveable section in an extended position.

10 Claims, 34 Drawing Sheets

DOOR 2
*WHEEL ASSY 106
IS LOCKED IN PLACE
TO COUPLING 100
MAGNET 104A
IS LOCKED TO STUD 107

DOOR 3 - 4
*WHEEL ASSY 106
IS LOCKED IN PLACE BY
MAGNET 106A AND STUD 107
FOR EASY RECONNECT OF
COUPLER 110 WITH STUD 108

(56) References Cited

U.S. PATENT DOCUMENTS

| | | | | | |
|---|---|---|---|---|---|
| 7,793,463 | B1 * | 9/2010 | Stansberry | E06B 9/04 | 49/67 |
| 7,874,090 | B2 * | 1/2011 | Flagg | G09F 15/0068 | 211/175 |
| 8,671,633 | B2 * | 3/2014 | Haab | E05D 15/0604 | 160/206 |
| 9,163,451 | B1 * | 10/2015 | Curry | E05D 15/24 | |
| 10,119,324 | B2 * | 11/2018 | Groff | E05D 15/26 | |
| 10,280,678 | B1 * | 5/2019 | Rendon, Jr. | E06B 3/509 | |
| 10,808,425 | B2 * | 10/2020 | Snell | E05B 65/0876 | |
| 10,954,707 | B2 * | 3/2021 | Hailey | E05D 15/581 | |
| 11,098,511 | B2 * | 8/2021 | Vander Bent, Jr. | E06B 3/5072 | |
| 11,098,514 | B2 * | 8/2021 | Vander Bent, Jr. | E05D 15/58 | |
| 11,225,791 | B2 * | 1/2022 | Gosling | E05D 7/009 | |
| 2004/0250475 | A1 * | 12/2004 | Seaman | E06B 3/921 | 49/501 |
| 2014/0352220 | A1 * | 12/2014 | Rees | E06B 3/509 | 49/164 |
| 2018/0258676 | A1 * | 9/2018 | Rebarchek | E05D 15/26 | |
| 2019/0360200 | A1 * | 11/2019 | Sloss | E06B 9/50 | |
| 2024/0263501 | A1 * | 8/2024 | Hane | E05D 15/264 | |

FOREIGN PATENT DOCUMENTS

| | | | | | |
|---|---|---|---|---|---|
| DE | 102008030321 | B3 | * | 10/2009 | E05C 1/04 |
| DE | 102011085044 | A1 | * | 4/2013 | E05D 13/04 |
| KR | 20080053259 | A | * | 5/2008 | |
| KR | 20180033034 | A | * | 1/2017 | |
| KR | 102423805 | B1 | * | 7/2022 | E05D 15/30 |
| KR | 102628399 | B1 | * | 1/2024 | E06B 3/481 |
| WO | WO-2019040520 | A1 | * | 2/2019 | E05D 15/48 |

* cited by examiner

UP

NEUTRAL

DOWN

DOOR 2
*WHEEL ASSY 106
IS LOCKED IN PLACE
TO COUPLING 100
MAGNET 104A
IS LOCKED TO STUD 107

DOOR 3 - 4
*WHEEL ASSY 106
IS LOCKED IN PLACE BY
MAGNET 106A AND STUD 107
FOR EASY RECONNECT OF
COUPLER 110 WITH STUD 108

DOOR REMOVAL

MEGA DOORS

FIG. 5D1
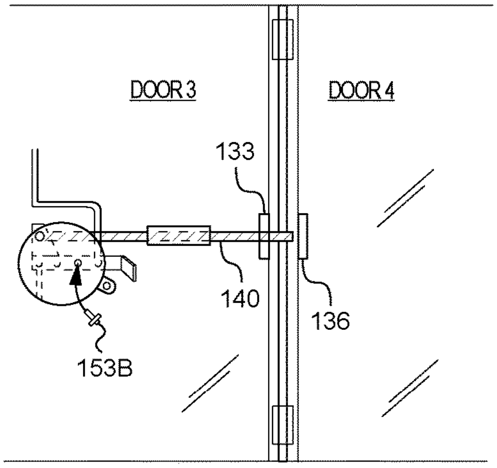
FIG. 5D2
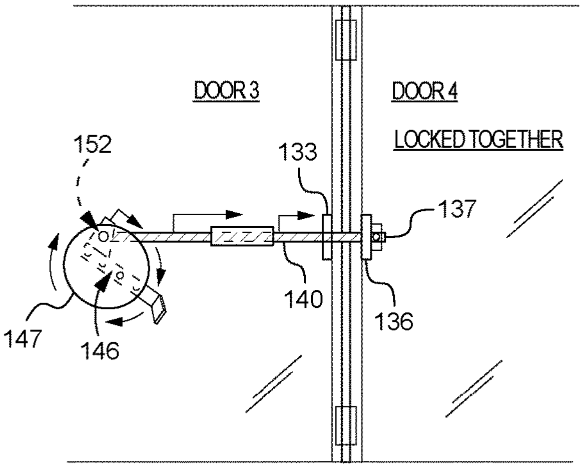
MEGA DOOR 3 + 4

FIG. 9A2
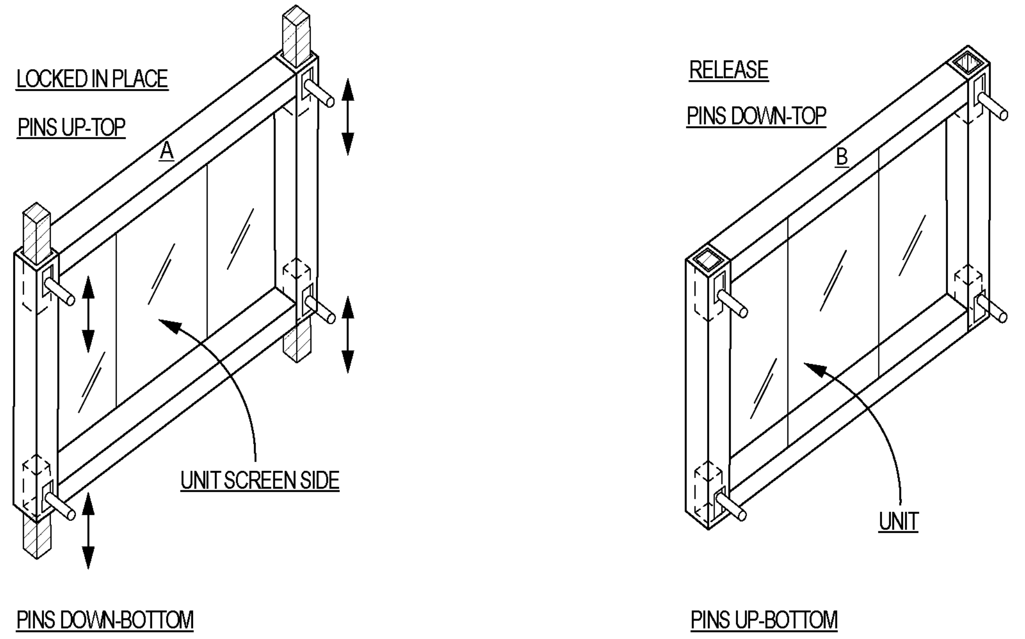

FIG. 9A1-1
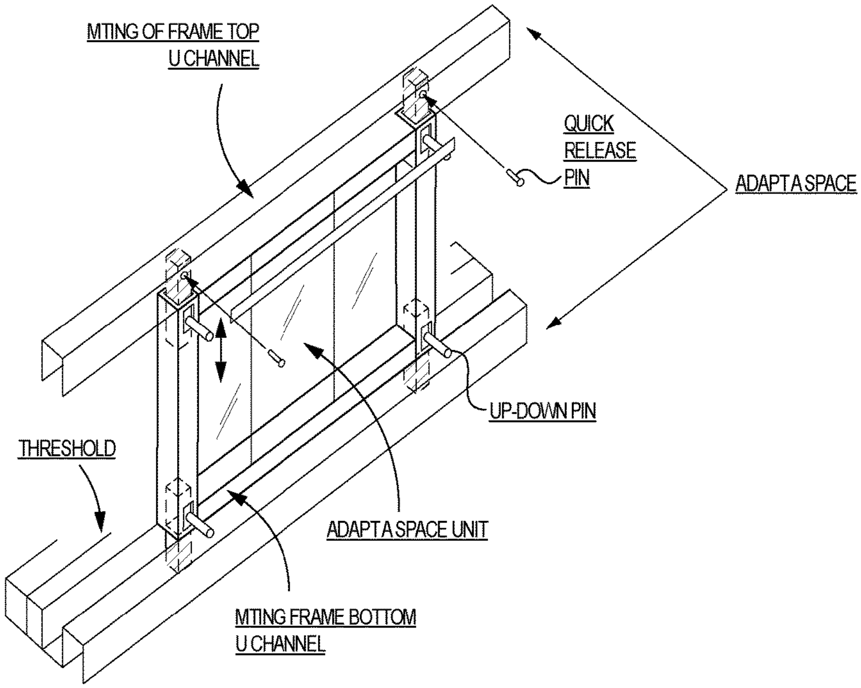
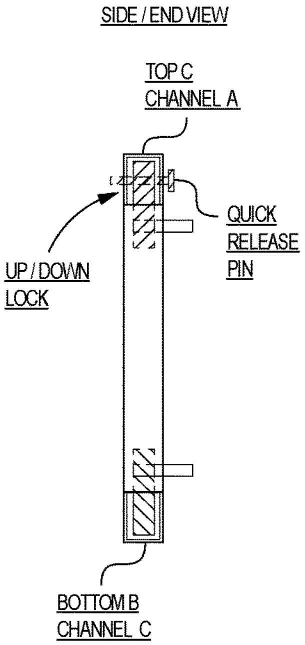

UNITS INSTALLED

ENCLOSURE SYSTEM

BACKGROUND

Technological Field

The present disclosure relates to a modular enclosure, more specifically a modular enclosure that can be sized to a particular setting such as a boat, mobile home, or porch.

Description of the Related Art

Homeowners are always looking to expand their homes on their land in order to better enjoy their property. To do this people put up three season room, porches, or build full additions. However each of these come with certain problems. Porches do not provide any protection from the elements, and are useless when rain or mosquitos come around. Porches are also expensive, require foundations, and can't be placed everywhere. Three season rooms, and additions are very costly, and often require a permit to put up. For these reasons, and others, homeowners are stuck going into further dept to take full advantage of their property.

Thus a need exists to provide a way to expand potential uses for structure that is easy to install, that is compatible and adaptable to multiple structures and inexpensive to install. The present disclosure may provide a solution for at least one of these remaining challenges.

SUMMARY OF THE INVENTION

An enclosure system that can be used on a house, mobile home, or a boat is disclosed. The system includes a frame to be fastened to a base and exterior structure including a plurality of panels including at least a pair of side panels and a front panel, wherein a height and width of each panel is adjustable to fit the base and exterior structure. The front panel includes a plurality of sliding doors, wherein each of the sliding doors moves along a respective designated track; wherein the front panel includes a first locking mechanism on a first end, configured to allow each of the sliding doors to be locked in a locked position and allow each of the sliding doors to slide out of the frame in an open position. Each of the tracks includes a respective moveable section between a first end and a second end configured to allow each of the sliding doors to be removed or installed between the first end and the second end when the respective moveable section in an extended position.

The frame, panels, and doors can be modularly assembled. The frame can extended or narrowed along the length of the track in order to accommodate an increase or decrease of sliding doors. Each pair of adjacent sliding doors can be locked to each other in a closed position. Each pair of adjacent sliding doors can be locked to the frame in a closed position using a single locking mechanism.

The sliding doors can be opened in an accordion manner wherein a pair of adjacent doors are joined and slide together. The sliding doors are configured can be opened in a swinging manner wherein the sliding doors are split into a first half and a second half and swung outward from the track separately. The sliding doors can be grouped in a plurality of combinations to be swung inward or outward when opened in an accordion manner. The sliding doors can be opened in a sliding manner, wherein each door freely travels along the track.

A magnet can be located on a portion of the frame configured to locate a roller in a desired position when any sliding doors are removed in order to keep the roller in position for reinstallation of the doors. Each sliding door can include a catch for pushing or pulling an adjacent sliding door along the track. The system can also include a respective hinge for securing each of the sliding doors to the frame, and configured to be opened manually to remove each of the sliding doors.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 5D1—shows creation of door 3-4 Mega Door connection.

FIG. 5D2—shows an actuating lever down moving cross shaft laterally thru two connectors and pinning them so they are locked together.

FIG. 9*a*2 shows an option to easy install/remove doors from the mounting frame.

FIG. 9A1-1 shows the installation of the product into the frame structure.

FIG. 9A—shows the installation of the upper bushing for the quick release door hinges.

DETAILED DESCRIPTION

Figure 1B:
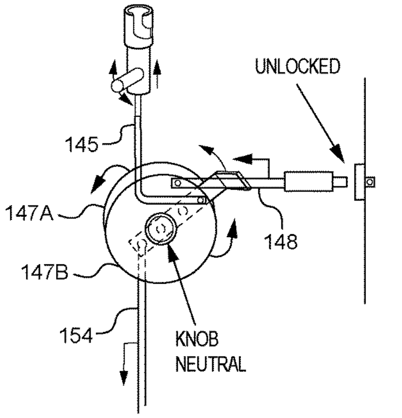
FIG. 1B shows a disconnection step of a two-door assembly with a level pushed up.

Reference will now be made to the drawings wherein like reference numerals identify similar structural features or aspects of the subject invention for purposes of explanation and illustration, and not limitation, a partial view of an exemplary embodiment of an enclosure system in accordance with the invention is shown in FIG. 1 and is designated generally by reference character 100 other embodiments of the deflection device in accordance with the invention, or aspects thereof, are provided in FIGS. 2-*x*, as will be described. The methods and systems of the disclosure can be used to provide. The following descriptions details the opening, closing, and affixing properties of the doors.

Figure 1A:
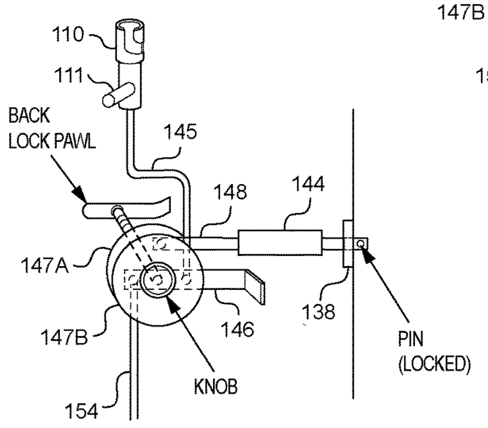
FIG. 1A shows a neutral position before two doors are disconnected according to the disclosure.
Figure 1C:
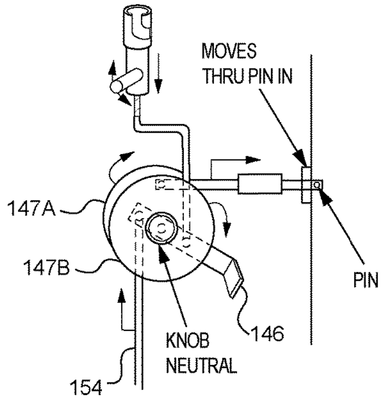
FIG. 1C shows the lever pushed down separating the male and female couplings.

The present disclosure provides a way to expand potential uses for structures, such as boats, homes, and mobile homes that is easy to install, that is compatible and adaptable to various structures and inexpensive to install. FIG. 1*a*-*c* shows an installation progression of the doors a operating lever 146 actions mechanisms on top and bottom to connect/disconnect two doors together to form one large mega door the top coupling 110 is down disconnected from top wheel assembly thus disconnecting doors from accordion folding mode with the back locking pawl, which locks doors 3-4 as mega door behind backside of doors 1-2 and is operated by door knob) and is shown as being is straight across thus locking doors 1-2. The lower guide pin 154 is pulled up out of lower guide channel. The cross link 144-148 has moved linearly thru connector plate 138—locking doors 3-4 together forming—1 mega door- and secured with a pin. The front door knob operates open/close by twisting and as such rotates back lock pawl to lock/unlock mega door.

In FIG. 1*b* the lever 146 is in the up position disconnecting the doors joined together as mega door and creating accordion/folding doors. The top slotted female coupling 110 moves up into wheel assembly male coupling with extended pin thus connecting door 3 to upper track for fold once upper female coupling 110 is thru pin in wheel male coupling the pin as shown is rotated counterclockwise thus twists coupling 110 into side slot and locks coupling 110 into upper wheel assembly. The lower guide pin 145 moves down into lower guide channel. The crosslink 148 moves left unlocking link from the doors. In FIG. 1*c* a lever is pushed down to create mega door by joining pair of doors 1 and 2/3 and 4 together to form another mega door. The top rotator pin is twisted to the left out of slotted side lock channel. The top female coupling is pulled down thru now straight channel thus pulling male coupling out of wheel assembly and disconnecting doors from accordion/folding mode. The bottom guide pin 154 is pulled up thus raising up guide pin out of lower channel and freeing all doors to swing open. The cross link is slid linearly into and thru connector plates thus locking 2 doors together to form 1 mega door.

Figure 2:
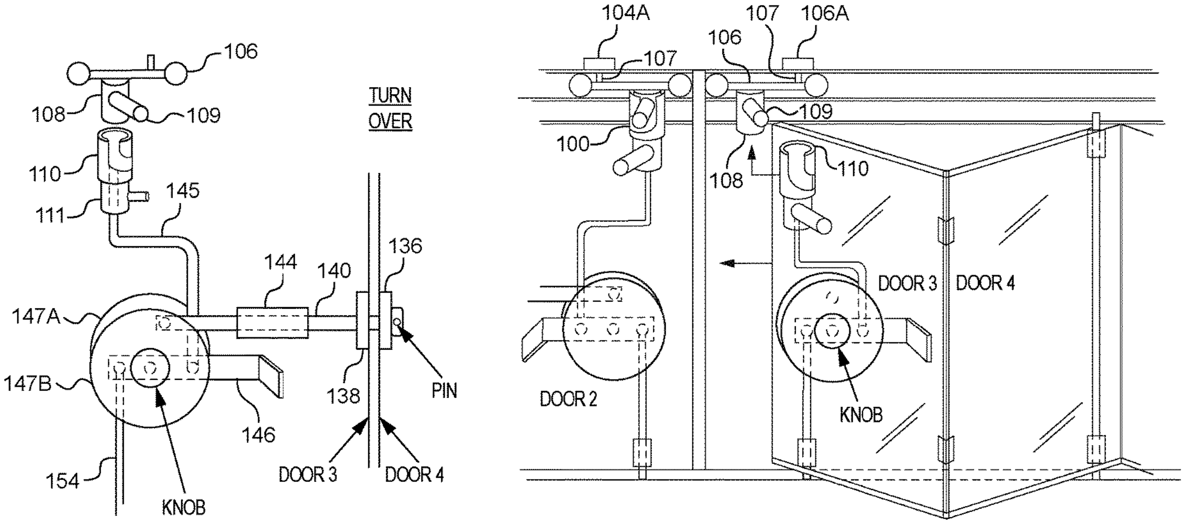
FIGS. 2 and 2A show a first step of a frame opening sequence according to the disclosure.
Figure 2A:
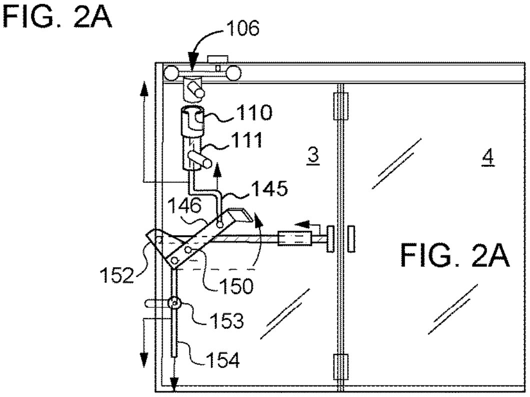
Figure 2C:
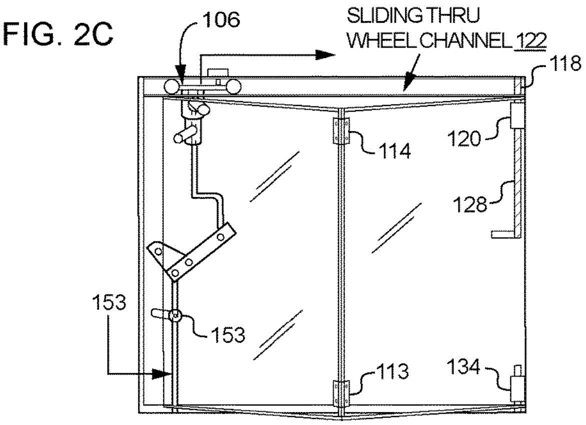
FIG. 2C shows a third step of a frame opening sequence according to the disclosure.
Figure 2B:
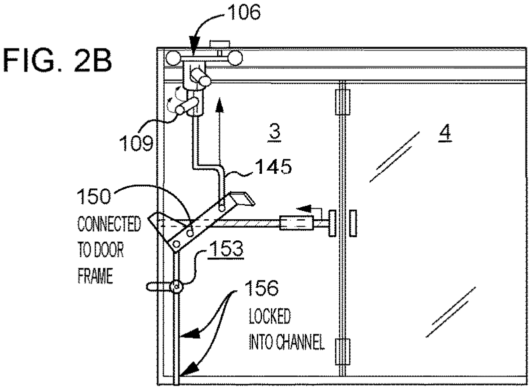
FIG. 2B shows a second step of a frame opening sequence according to the disclosure.
Figure 2D:
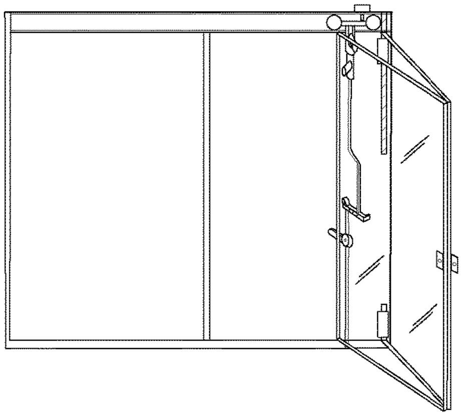
FIG. 2D shows a fourth step of a frame opening sequence according to the disclosure.
Figure 2E:
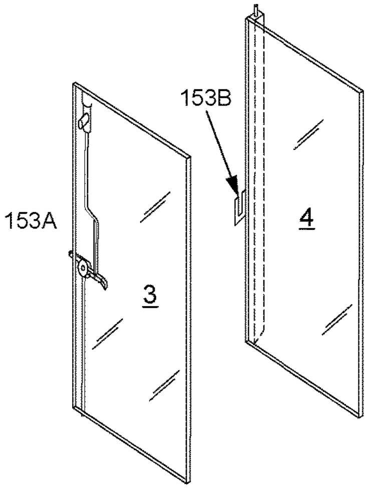
FIG. 2E shows a front view of a doorknob.
Figure 2E:
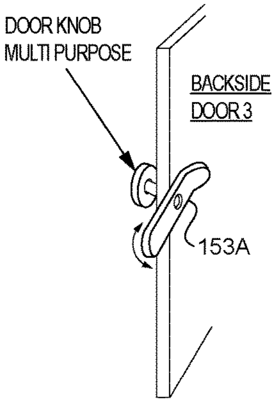
Figure 2F:
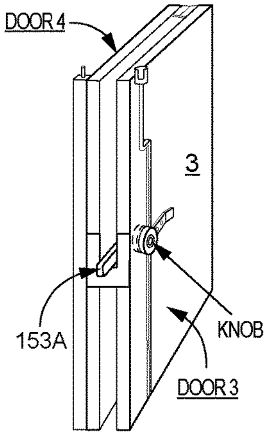
FIG. 2F shows doors folded and locked together by a pawl on one of the doors.
Figure 2G:
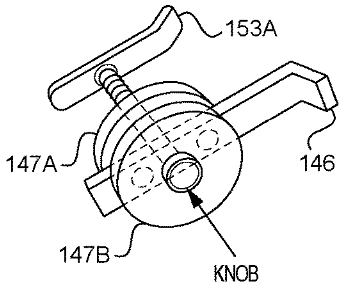
FIG. 2G shows a multi-purpose assembly showing a multi-purpose handle.

FIG. 2 a show an individual frame opening sequence. FIG. 2*a* shows a right-side door mechanism. Wheel assembly 106 includes the lower male connector 108. This assembly rides in the wheel track. When connected to female coupling 110 joins two doors which are hinged together into an accordion/folding mode. Male coupling 108 secures to the wheel assembly 106 and male coupling pin 109 is a fixed pin secured to the male coupling 108 which guides the female coupling 110 as it is moved up through the straight channel in coupling 110. When coupling is raised up the pin 109 enters straight channel in coupling 110 till the bottom of the channel at that point the coupling 110 is rotated around the pin 109 into the angled bottom channel and released. The weight of the door (where all the above is connected) transfers the downward force (weight) on the two couplings 110 and 109 which are locked together with pin 109. This secures the two doors to the wheel assembly 106 so as all doors will slide along wheel track to create the accordion/folding of the 2 hinged doors.

The multi-function handle assembly is sandwich in design having the two sandwich plates serve as the “bread” and the connectors to shaft 145, lower guide pin 154, and lever serve as the “meat”. The aforementioned action is done by the user moving the lever 146 except for the open/close of the mega door this is done by twisting the doorknob in the center of the assembly. Lower guide shaft 154 moves down and in or up and out of the guide channel in the lower threshold. The purpose of this is to secure the lower door assemblies linearly as they move in the accordion/folding mode across the span of the upper wheel track. Connector collar 144 joins shafts 140 and 148 which can be opposite threads together. This collar is split with one half being left hand thread and the other being right hand thread so as to be able to accommodate the different widths needed for the door/window frames as they are adjusted to fit the application to meet overall product adjustable width.

Connector plates 136 and 138 both have holes in the center to allow the cross shaft 140 to slide thru them both and much as the a "draw bar lock" secure the doors together to create one large swing mega door.

FIG. 2 shows a sequence of a frame opening. This is the door mechanism on the left side only or door 2 (knob less) this side door mechanism is offset to the left to make room for the door mechanism on doors 2 and 4 as these are located as noted above directly on the outer edge of the door frame, thus requiring this mechanism to be offset inward to allow for space.

Figure 3A:
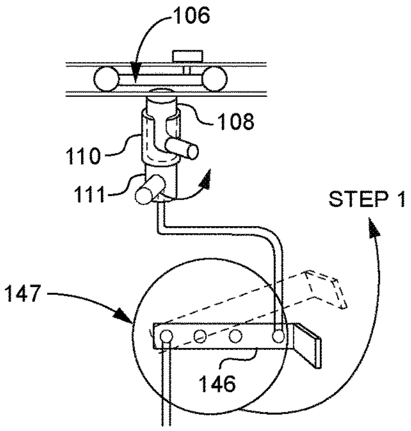
FIG. 3A shows an opening and closing feature for a male collar into a track according to the disclosure.
Figure 3B:
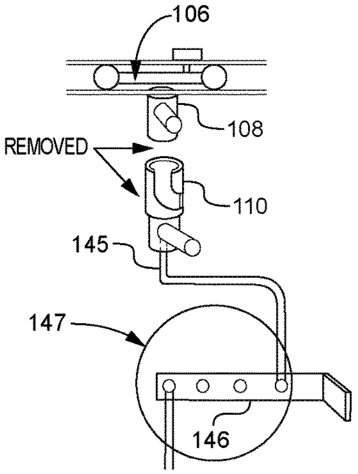
FIG. 3B shows an opening and closing feature for a male collar into a track according to the disclosure.
Figure 3C:
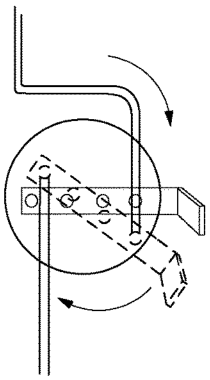
FIG. 3C shows an opening and closing feature for a male collar into a track according to the disclosure.

FIG. 3A-3C shows an opening and closing feature for a male collar into a track. Allowing the doors to move freely.

Figure 4A:
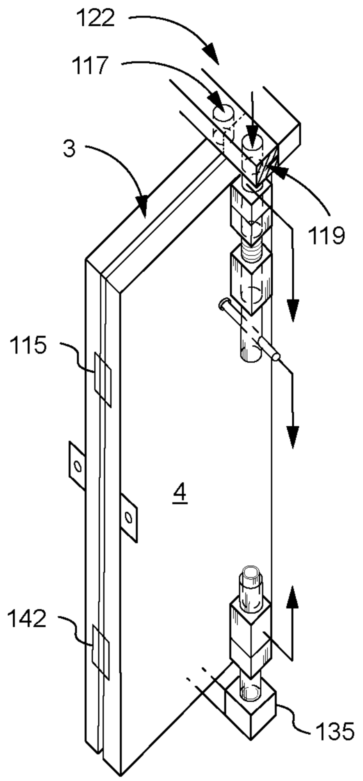
FIG. 4A-C shows and installation sequence for a pair of panels into the track according to the disclosure.
Figure 4B:
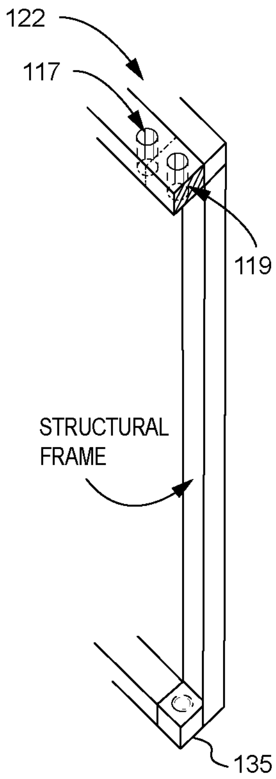
Figure 4C:
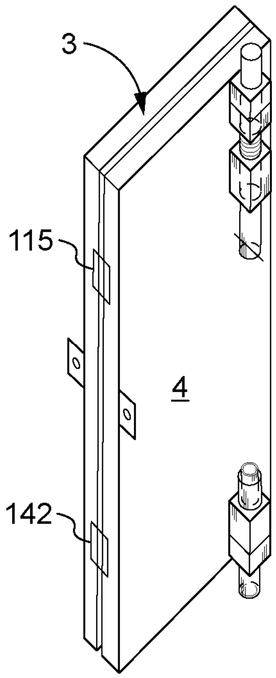

FIG. 4A-C shows and installation sequence for a pair of panels into the track according to the disclosure.

FIG. 5A-D shows an opening sequence for a single panel from a pair of panels out of a track according to the disclosure.

Figure 5A:
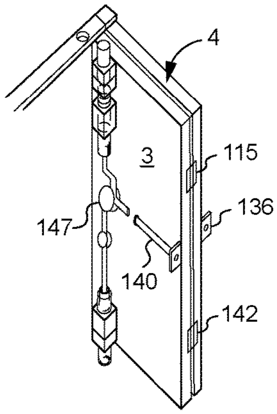
FIG. 5A-D shows an opening sequence for a single panel from a pair of panels out of a track according to the disclosure.
Figure 5B:
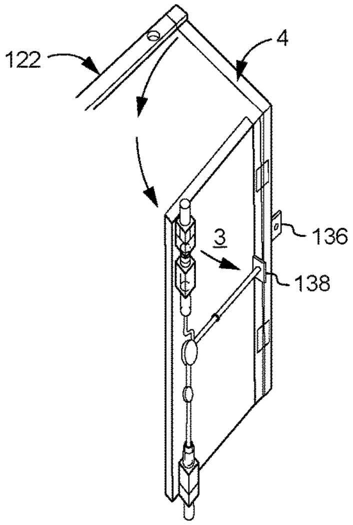
Figure 5C:
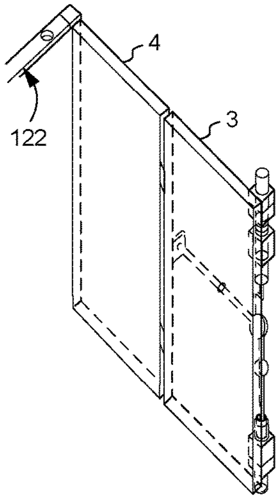
Figure 5D:
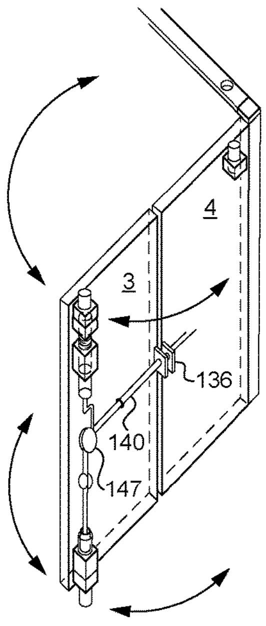
Figure 6:
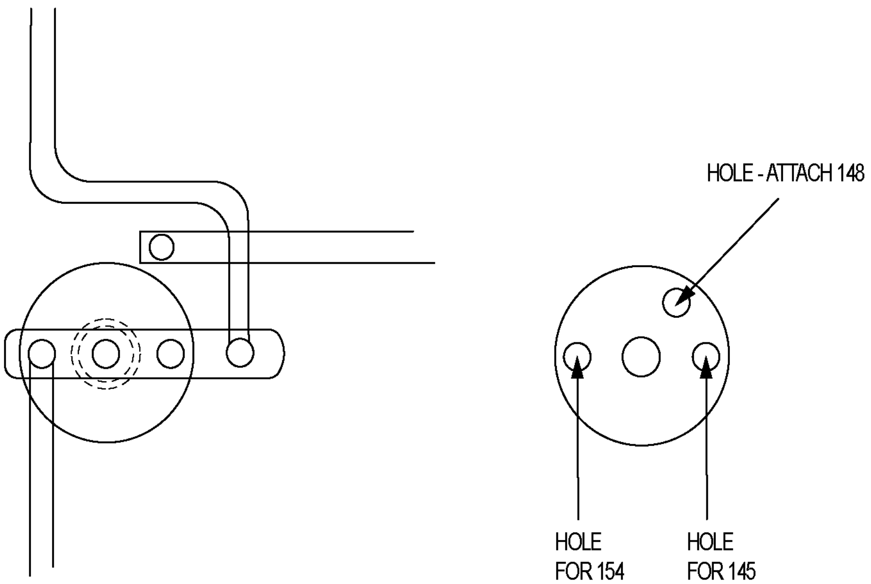
FIG. 6-6D—showing mounting point holes in sandwich plate hole for down link guide pin.
Figure 6A:
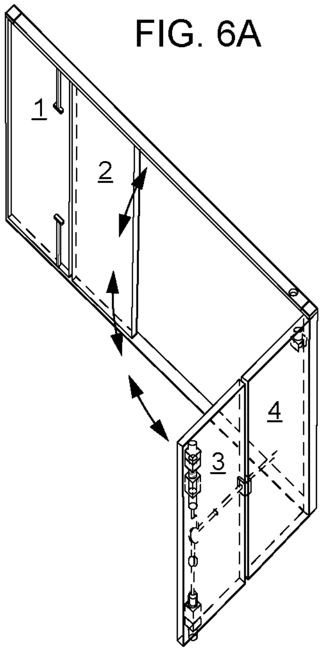
Figure 6B:
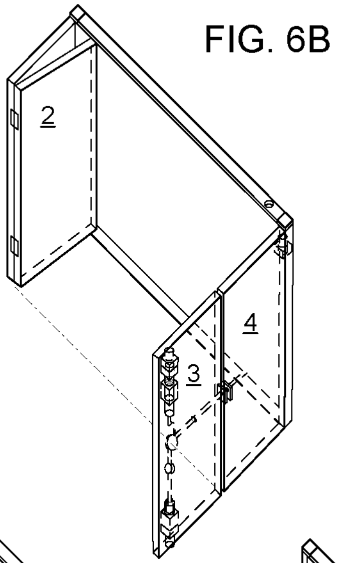
Figure 6C:
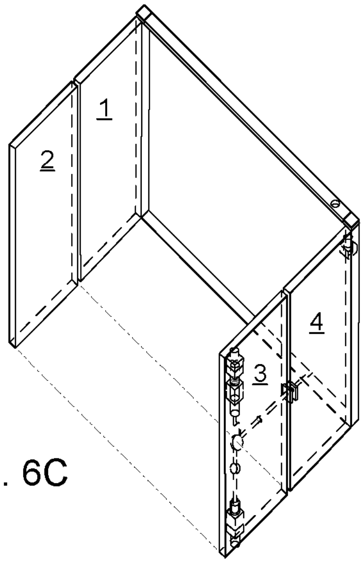
Figure 6D:
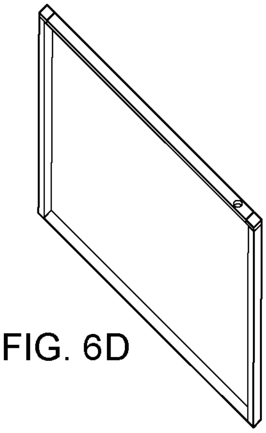

FIG. 5D1—shows creation of door 3-4 Mega Door connection.

FIG. 5D2—shows an actuating lever down moving cross shaft laterally thru two connectors and pinning them so they are locked together, allowing the knob as it is rotated to keep doors 3 and 4 together or unlocked from each other.

FIG. 6A-6D—showing mounting point holes on the frame in sandwich plate hole for down link guide pin.

Figure 7A:
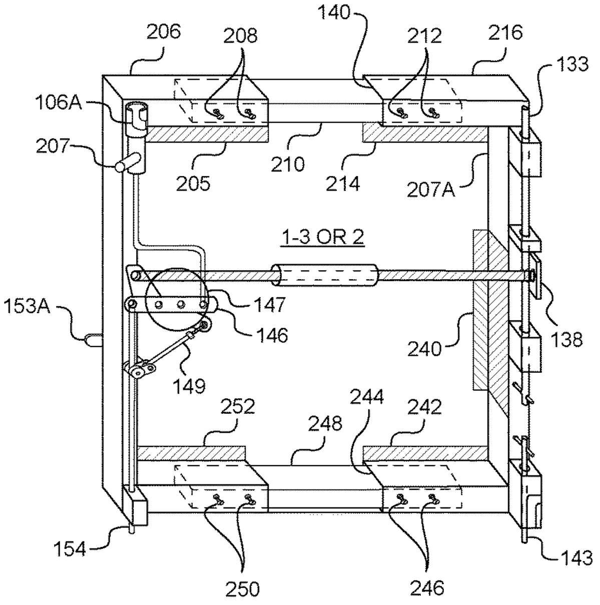
FIG. 7A-B showing telescopic door/window frames.
Figure 7B:
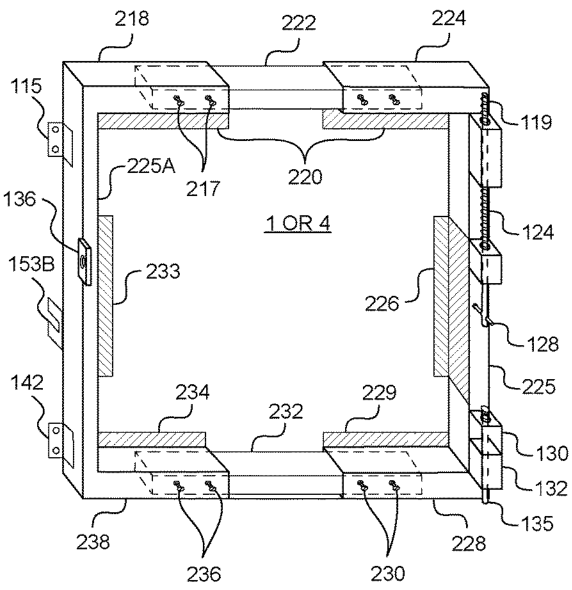
Figure 8A:
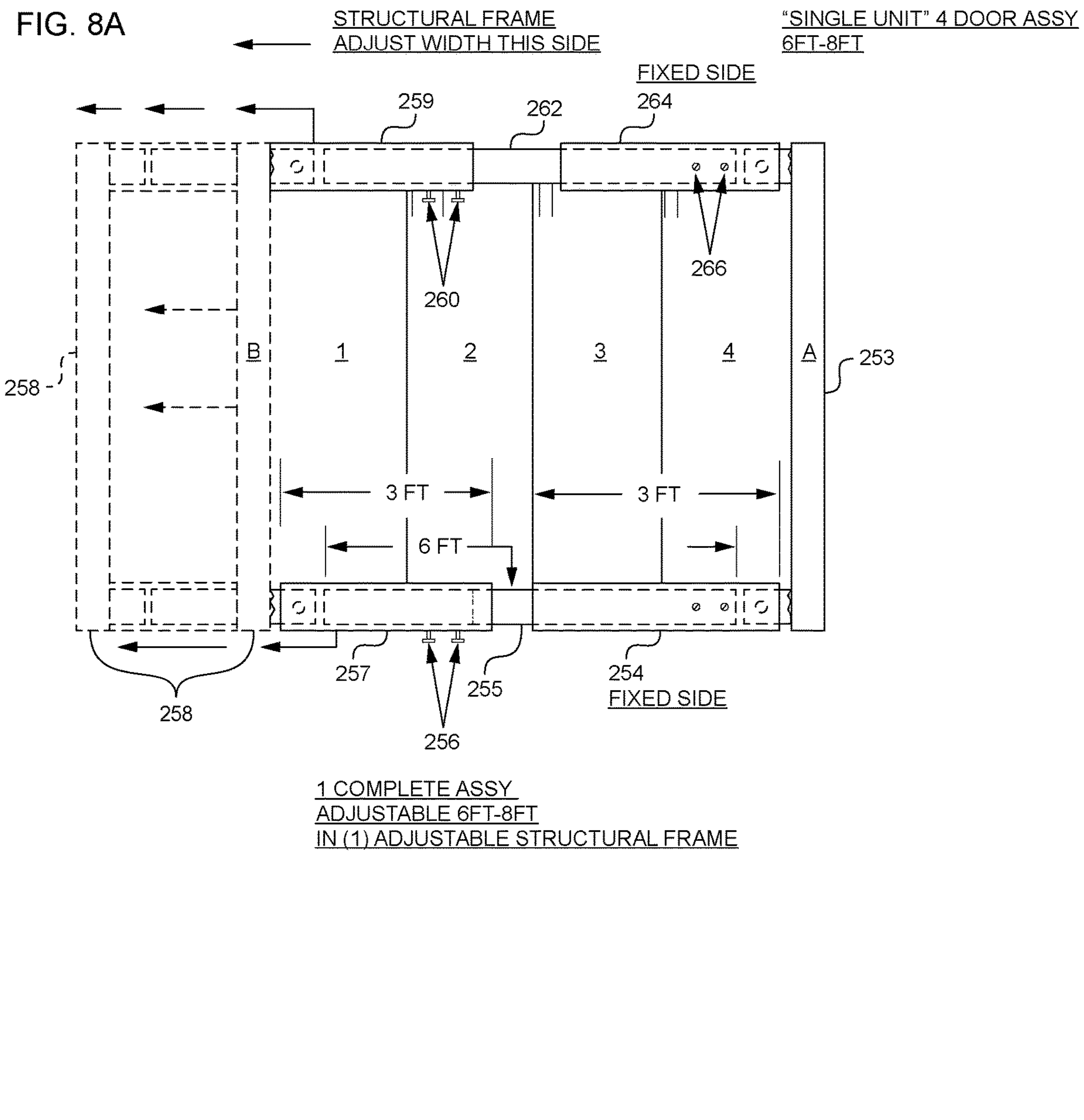
FIG. 8A shows a possible sliding sequence for panels within the track according to the disclosure.
Figure 8B:
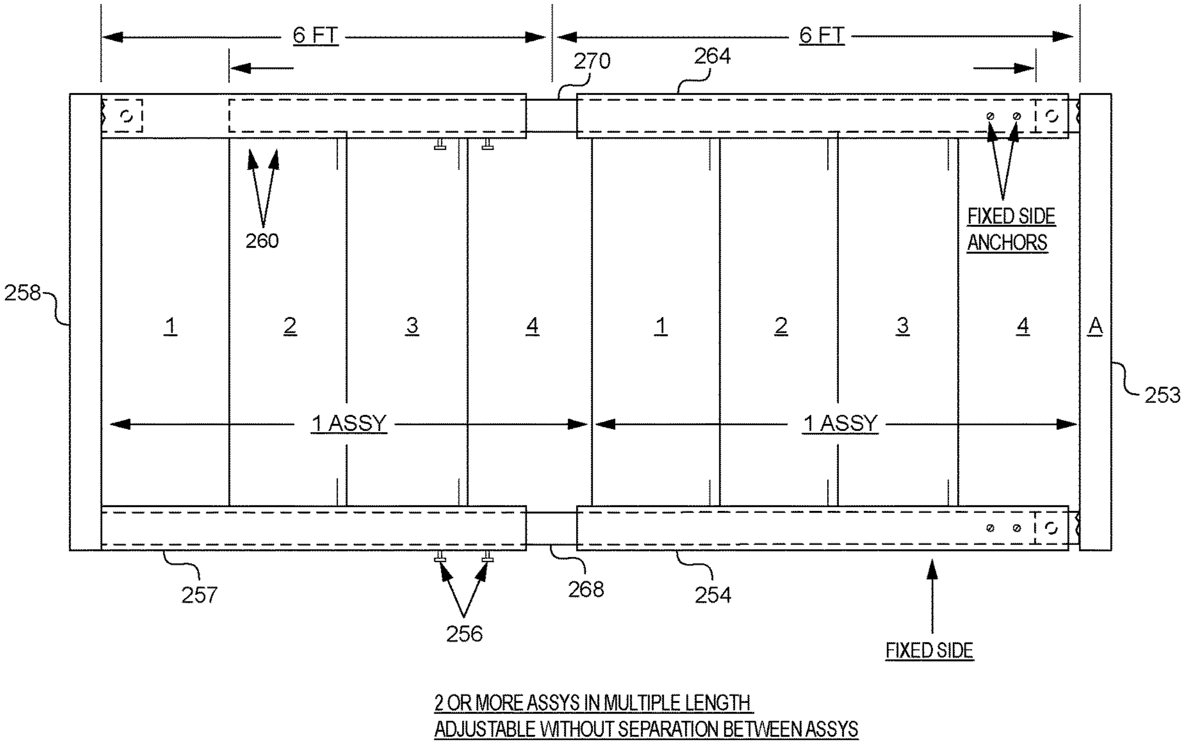
FIG. 8B shows a possible sliding sequence for panels within the track according to the disclosure.
Figure 8C:
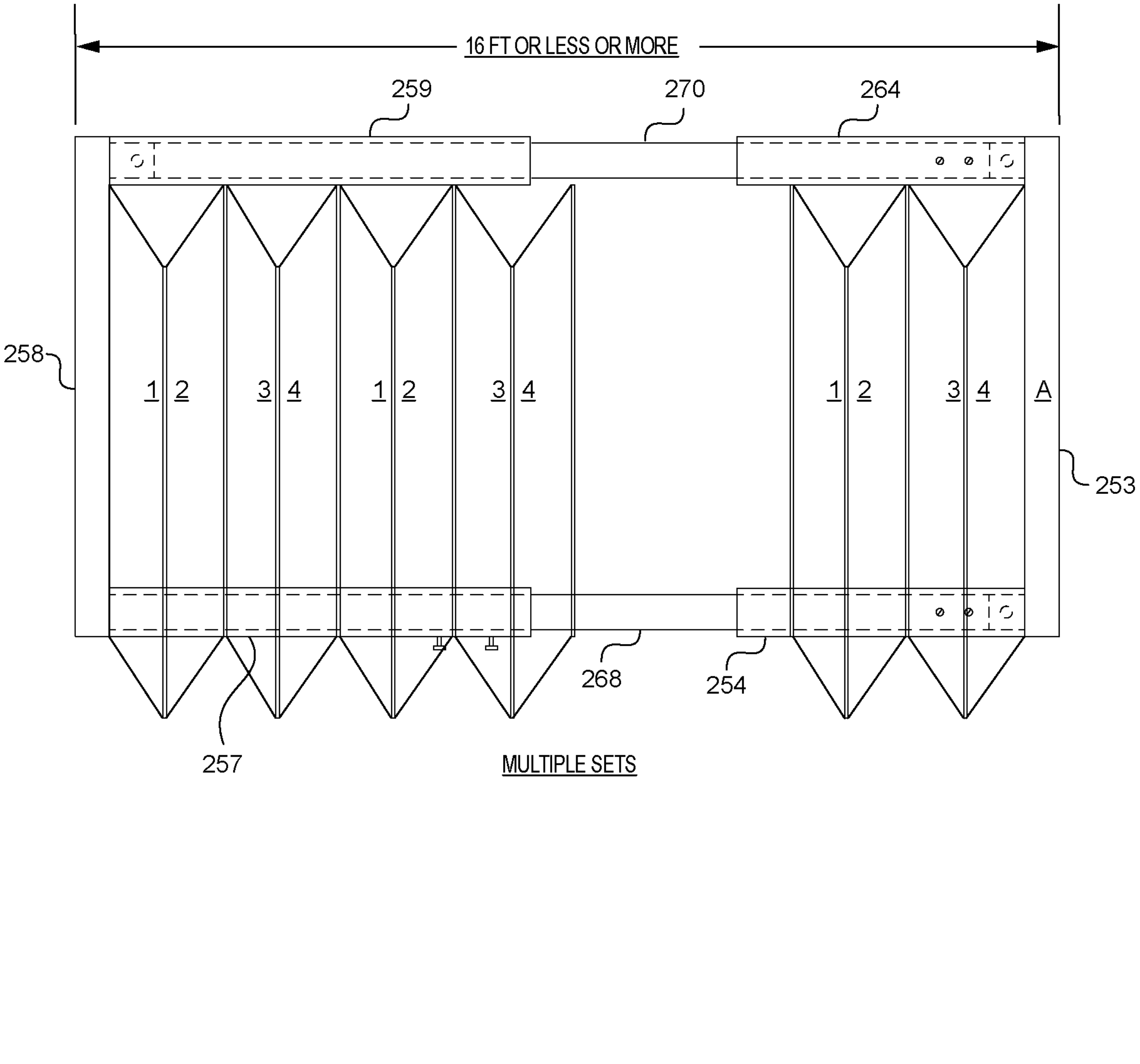
FIG. 8C shows a possible accordion sequence for panels within the track according to the disclosure.
Figure 8D:
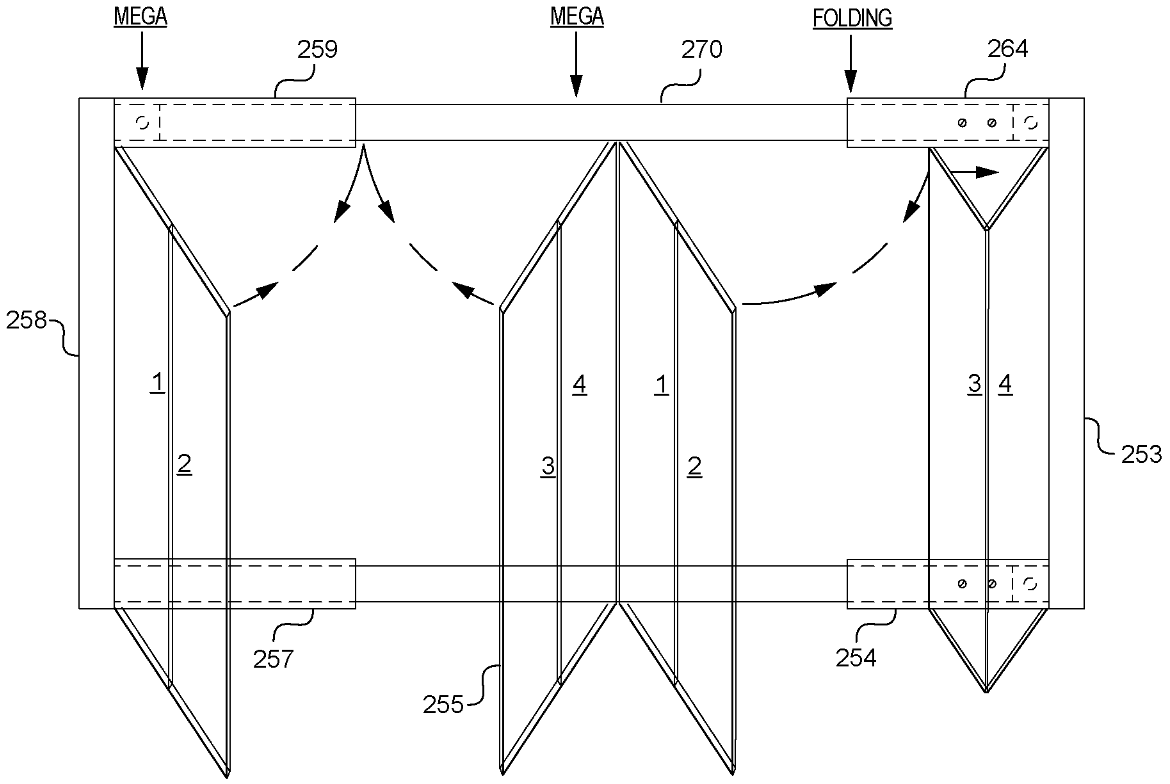
FIG. 8D shows a possible swinging sequence for panels within the track according to the disclosure.

FIG. 7A-B shows telescopic door/window frames.

FIG. 8A-D show possible sliding, swinging, and folding sequences for panels within the track.

Figure 9:
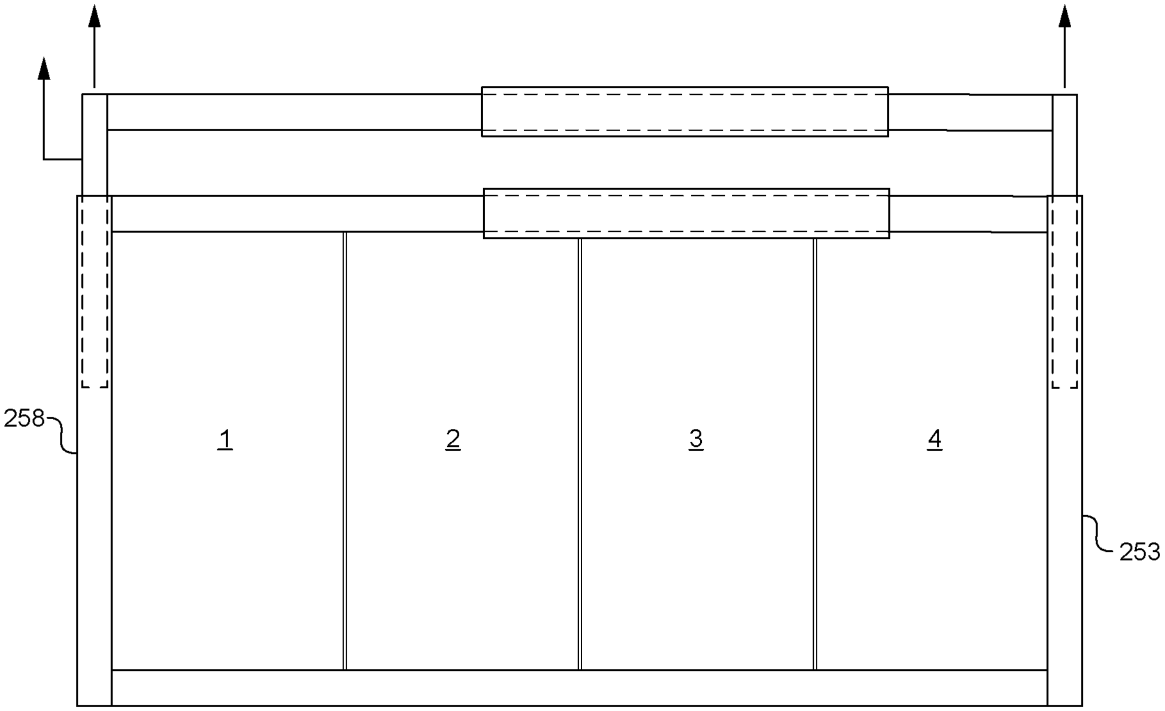
FIG. 9 shows the vertical upper telescopic connectors that are located in the side tubes that secure the product to an upper location.
Figure 9A:
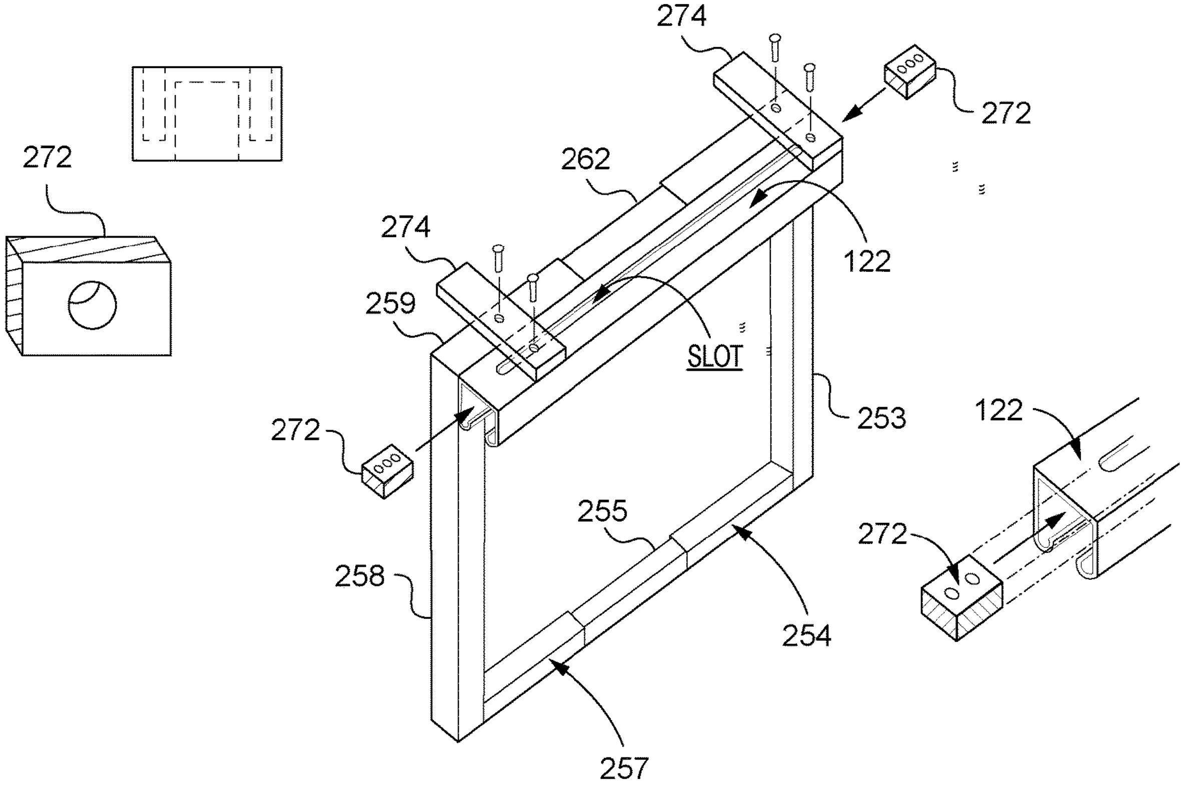
Figure 9B:
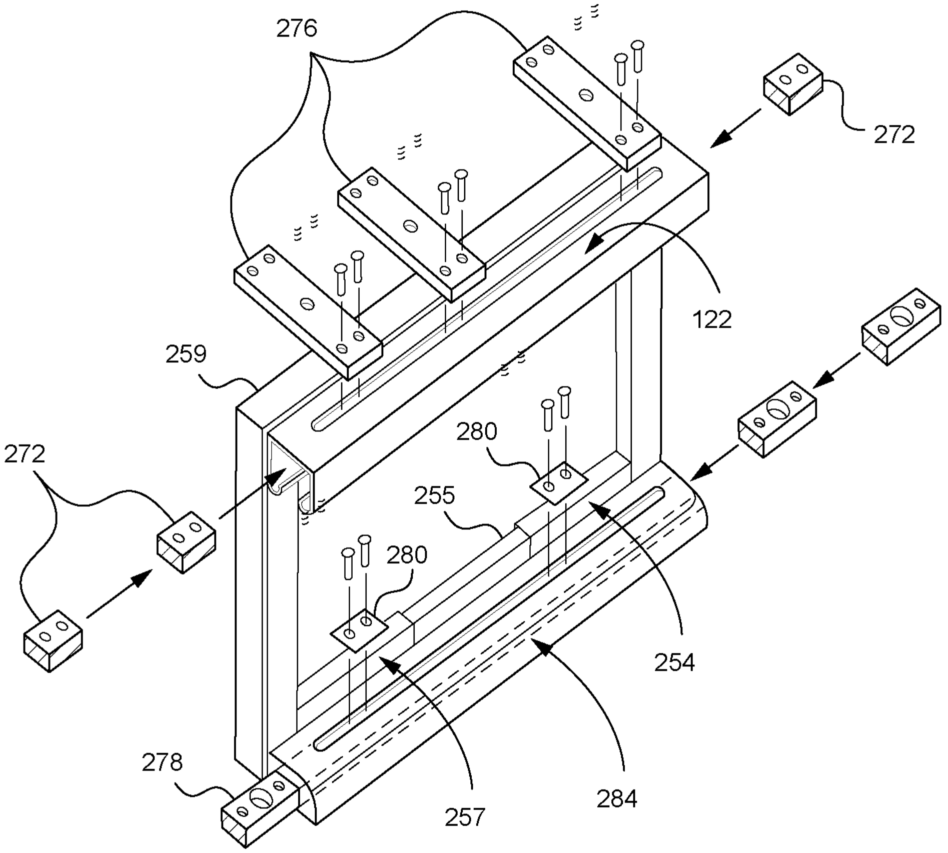
FIG. 9*b*—showing multiple locations of top hinge bushings in the upper wheel track and lower bushings in lower threshold where desired for multiple units.

FIG. 9 shows the vertical upper telescopic connectors that are located in the side tubes that secure the product to an upper location. FIG. 9*a*2 shows an option to easy install/remove doors from the mounting frame. FIG. 9A1-1 shows the installation of the product into the frame structure. FIG. 9A-shows the installation of the upper bushing for the quick release door hinges. FIG. 9*b*—showing multiple locations of top hinge bushings in the upper wheel track and lower bushings in lower threshold where desired for multiple units.

Figure 10A:
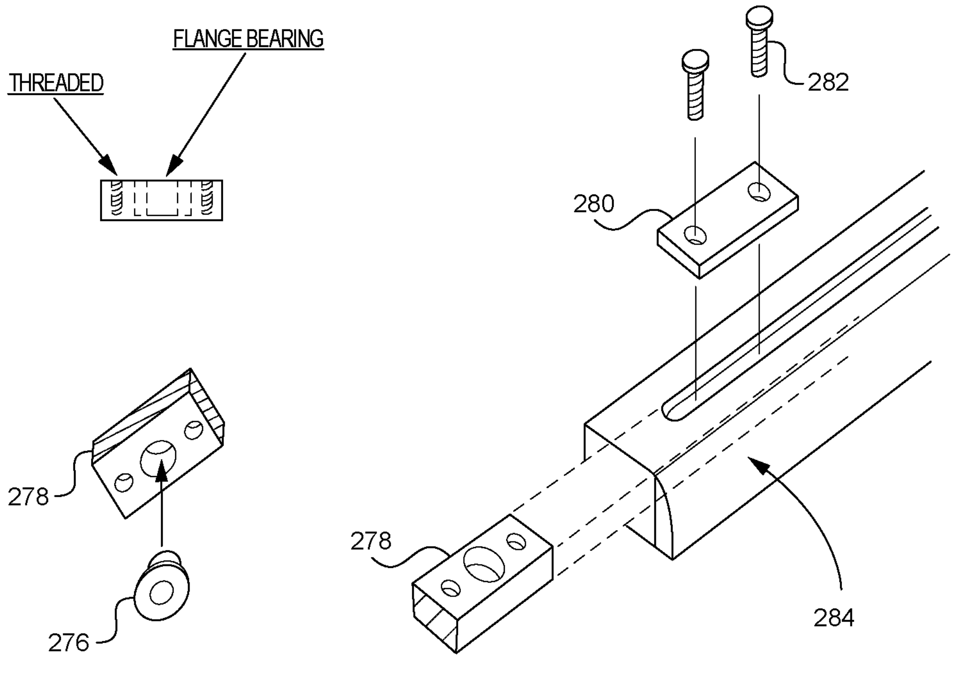
FIG. 10A shows the install of the lower Quick Release Hinge bush

FIG. 10A shows the install of the lower Quick Release Hinge bush to allow for door sliding within the track.

Figure 11A:
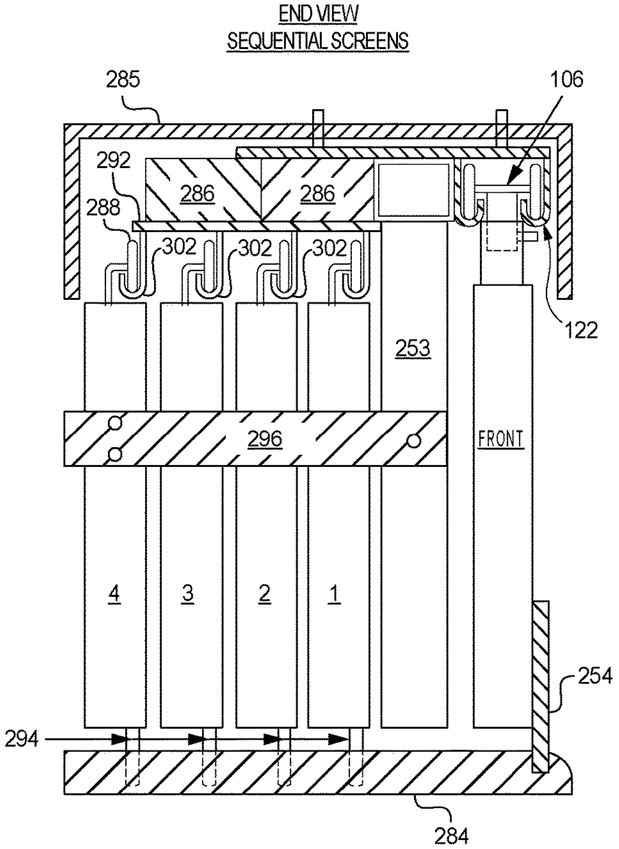
FIG. 11A shows a side view of the panels arranged along the track.
Figure 11B:
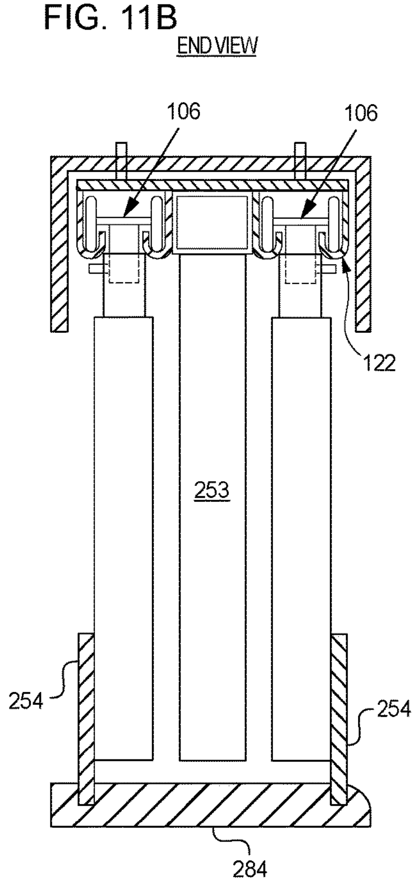
FIG. 11B shows an end view of the front folding doors with window inserts back folding doors with screen inserts.

FIG. 11A shows a side view of the panels arranged along the track, where the doors are back-to-back to back. FIG. 11B shows an end view of the front folding doors with window inserts back folding doors with screen inserts.

Figure 12:
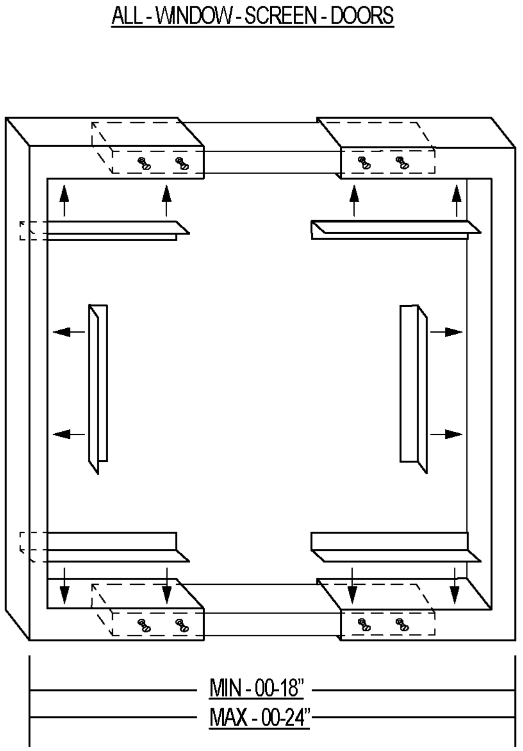
FIG. 12 shows a front view of all front and rear door frames exploded view showing a telescoping action of frame.

FIG. 12 shows a front view of all front and rear door frames exploded view showing a telescoping action of frame.

Figure 13A:
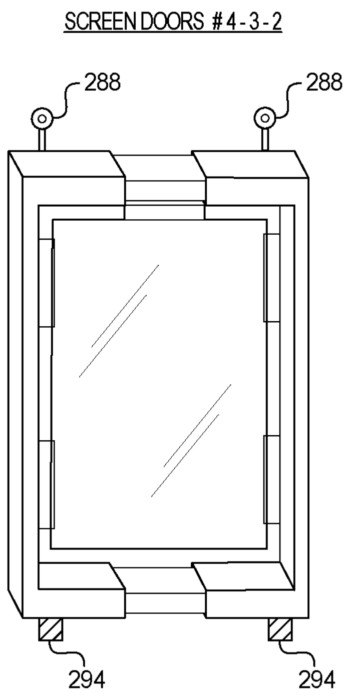
FIG. 13A shows top rollers and bottom guide fins.

FIG. 13A shows top rollers and bottom guide fins.

Figure 13B:
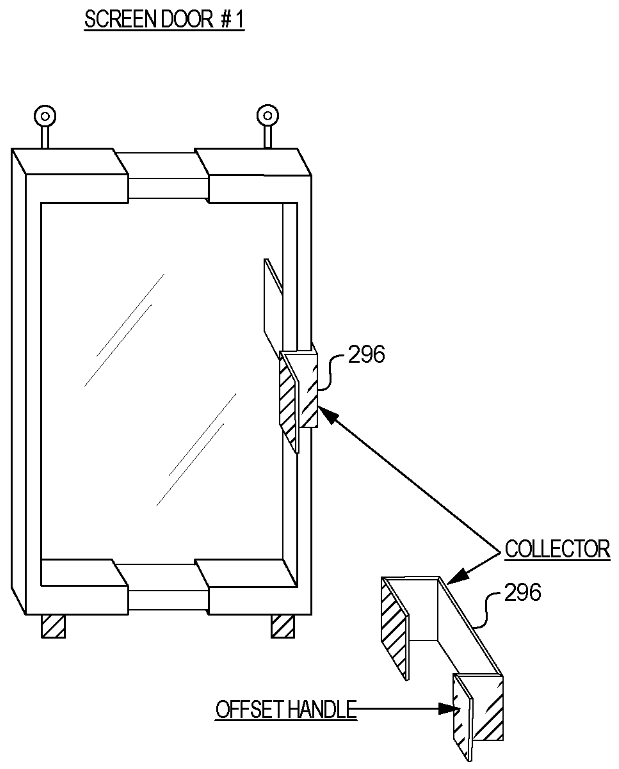
FIG. 13B showing the front Pull/push handle.

FIG. 13B showing the front Pull/push handle.

Figure 14:
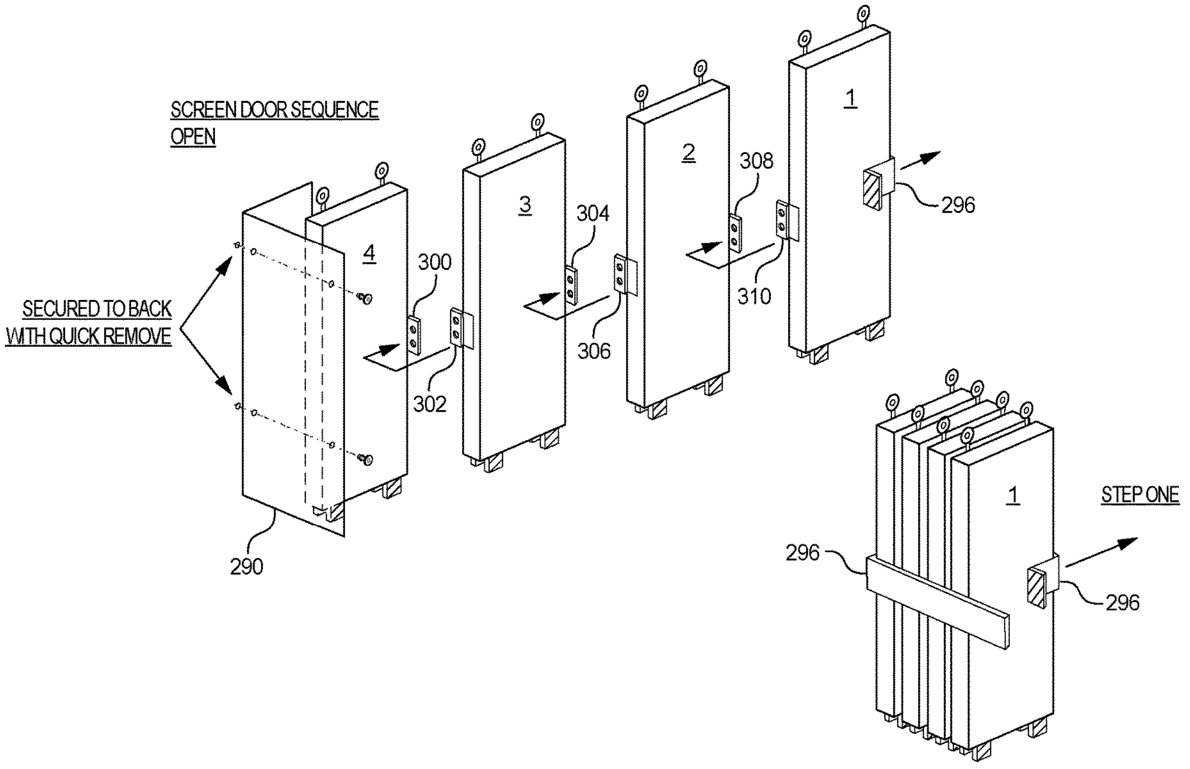
FIG. 14 shows a possible sliding sequence for panels within the track according to the disclosure.

FIG. 14 shows a possible sliding sequence for panels within the track where catcher 300-310 catch each other as the doors slide past each other to catch the next doo so that only one door has to be held by the used.

Figure 15A:
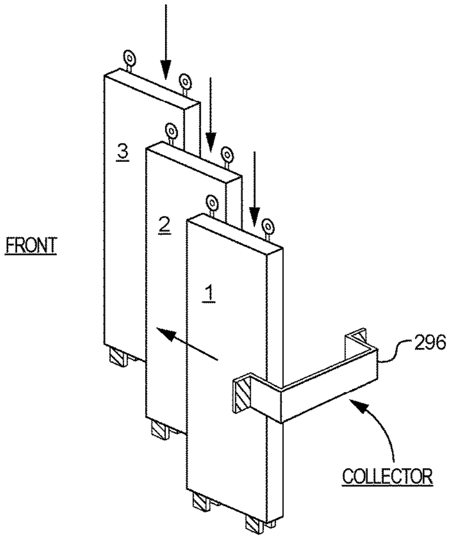
FIG. 15A shows a possible sliding sequence for panels within the track according to the disclosure.
Figure 15B:
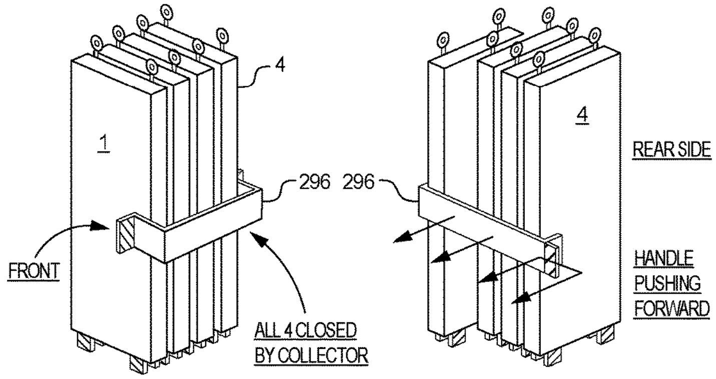
FIG. 15B shows a possible sliding sequence for panels within the track according to the disclosure.
Figure 16A:
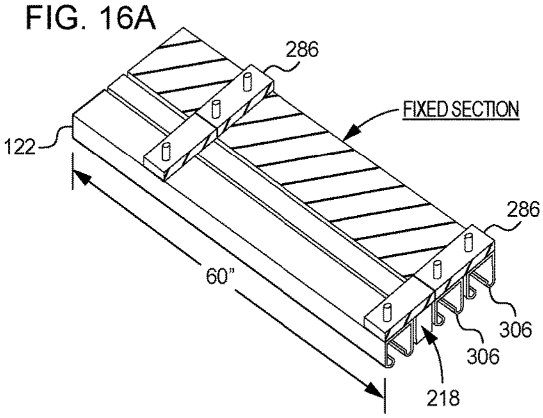
FIG. 16A-E shows how a section of the track can be removed from the track of the doors according to the disclosure.
Figure 16B:
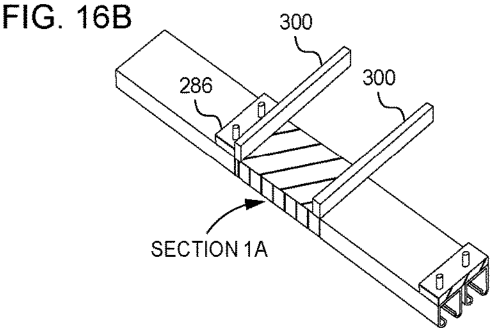
Figure 16C:
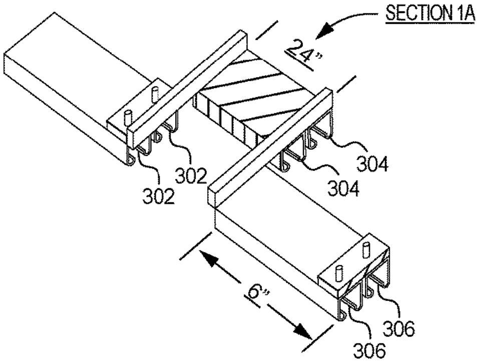
Figure 16D:
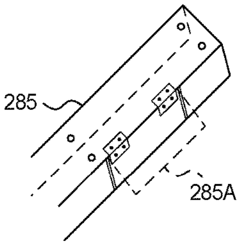
Figure 16E:
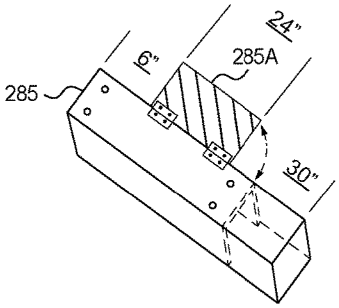

FIG. 15A shows a possible sliding sequence for panels within the track according to the disclosure. FIG. 15B shows a possible sliding sequence for panels within the track according to the disclosure.

FIG. 16A-E shows how a section of the track can be removed from the track of the doors according to the disclosure.

Figure 17A:
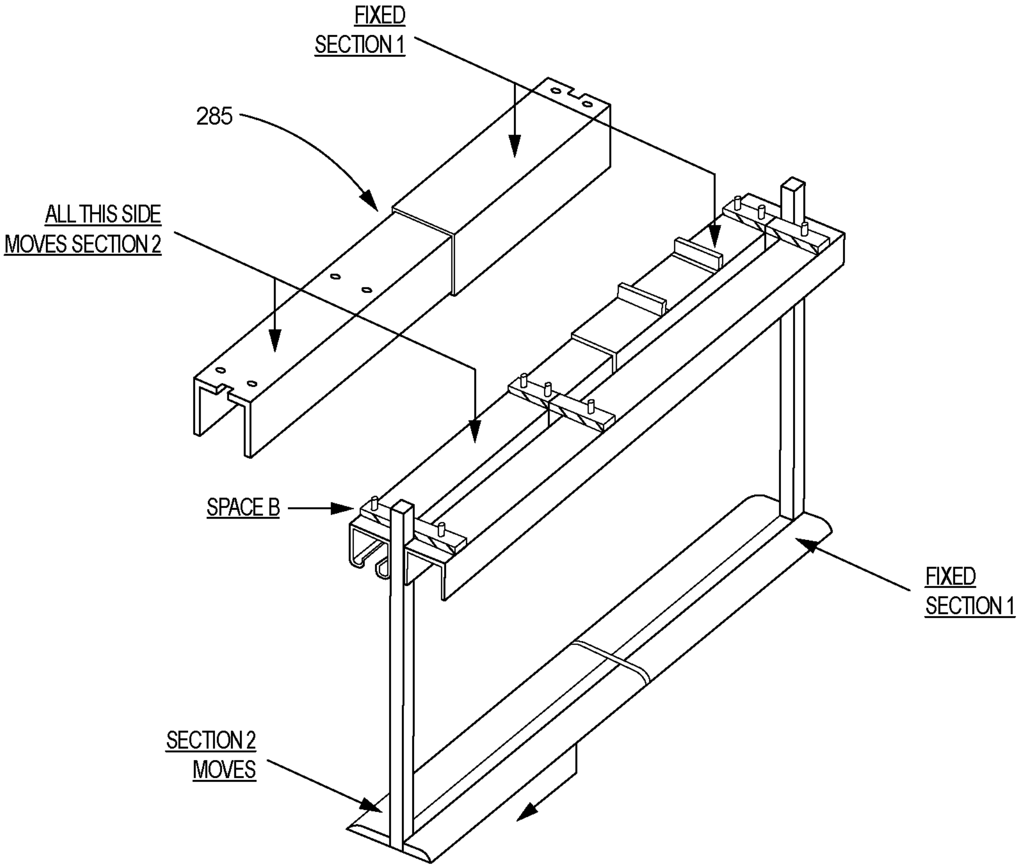
FIG. 17A shows the accordion door front and rear product.

FIG. 17A shows the accordion door front and rear product.

Figure 17B:
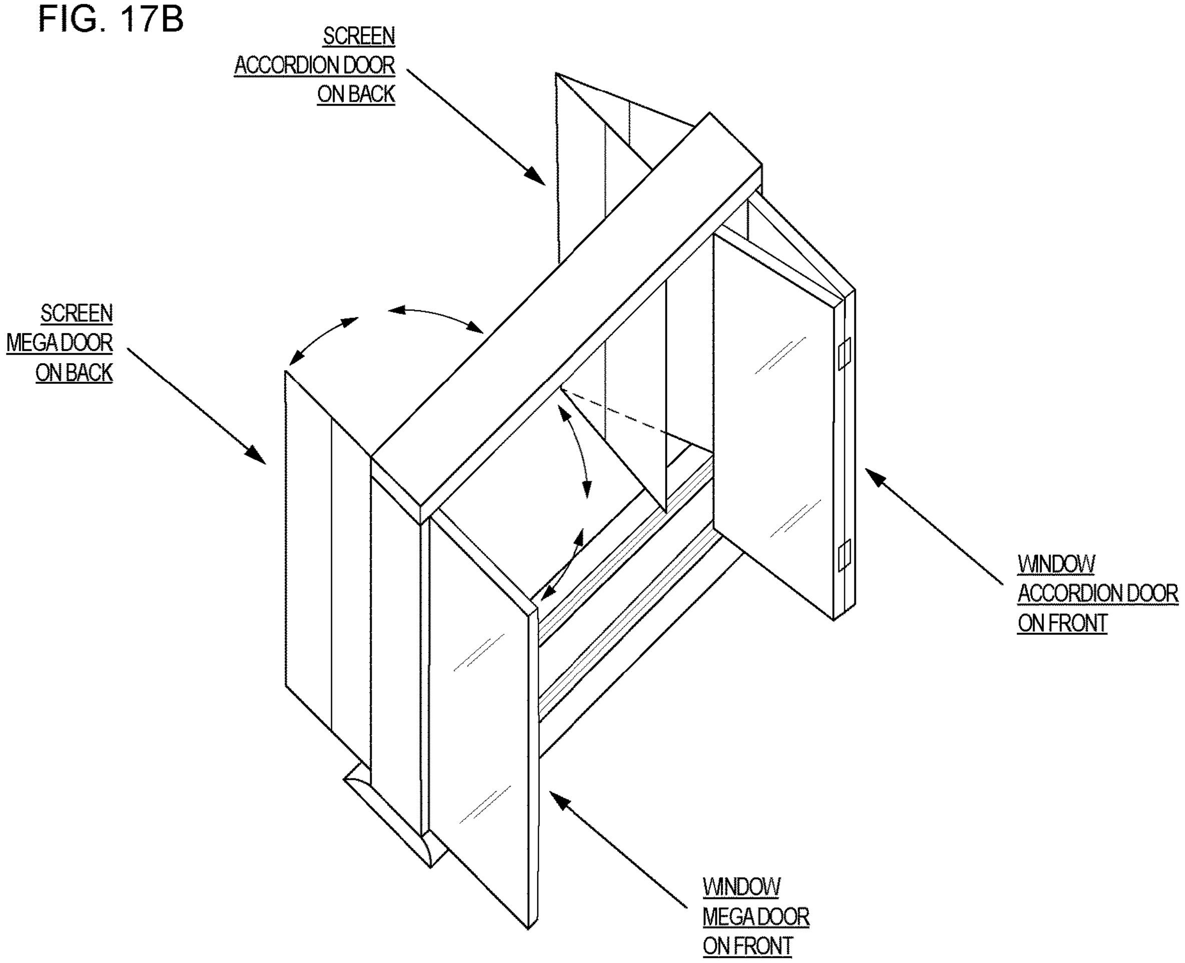
FIG. 17B shows a folding configuration according to the disclosure.

FIG. 17B shows a folding configuration according to the disclosure.

Figure 17C:
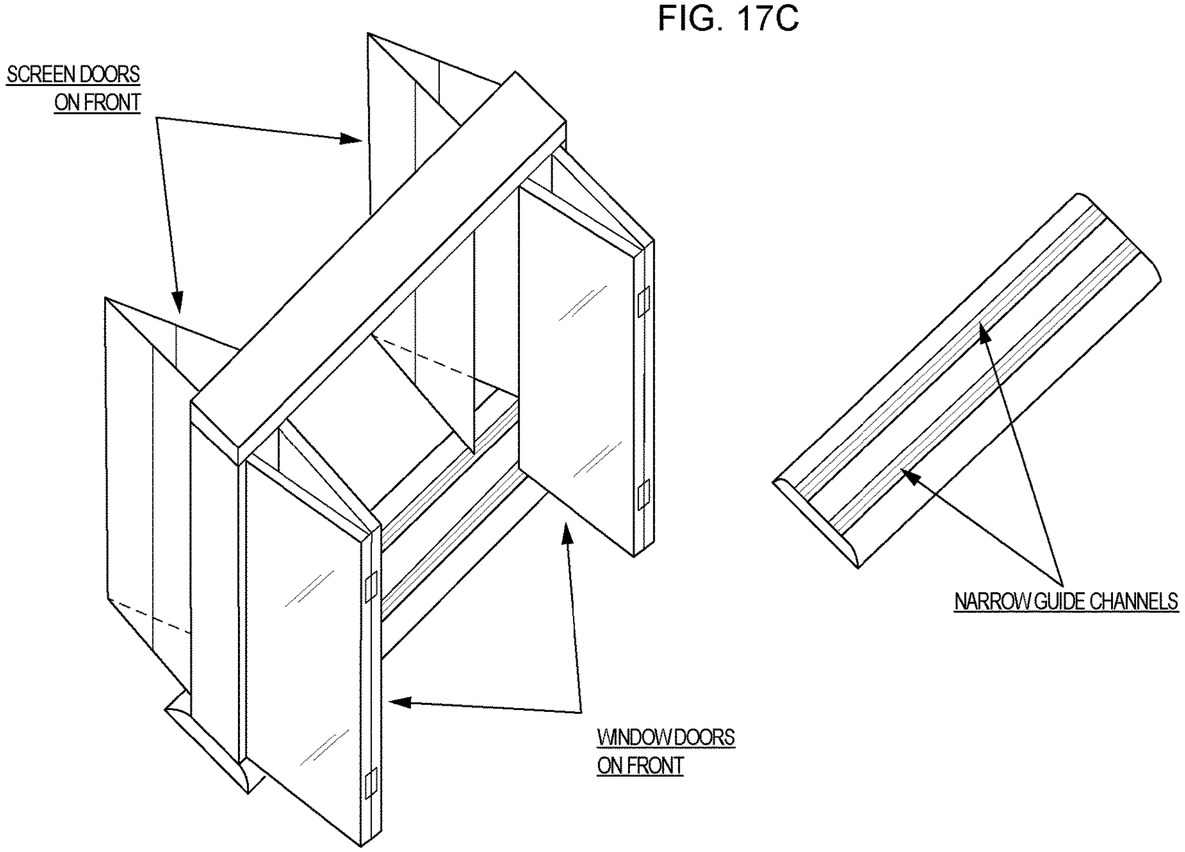
FIG. 17C shows a folding configuration of the doors according to the disclosure.

FIG. 17C shows a folding configuration of the doors according to the disclosure.

Figure 17D:
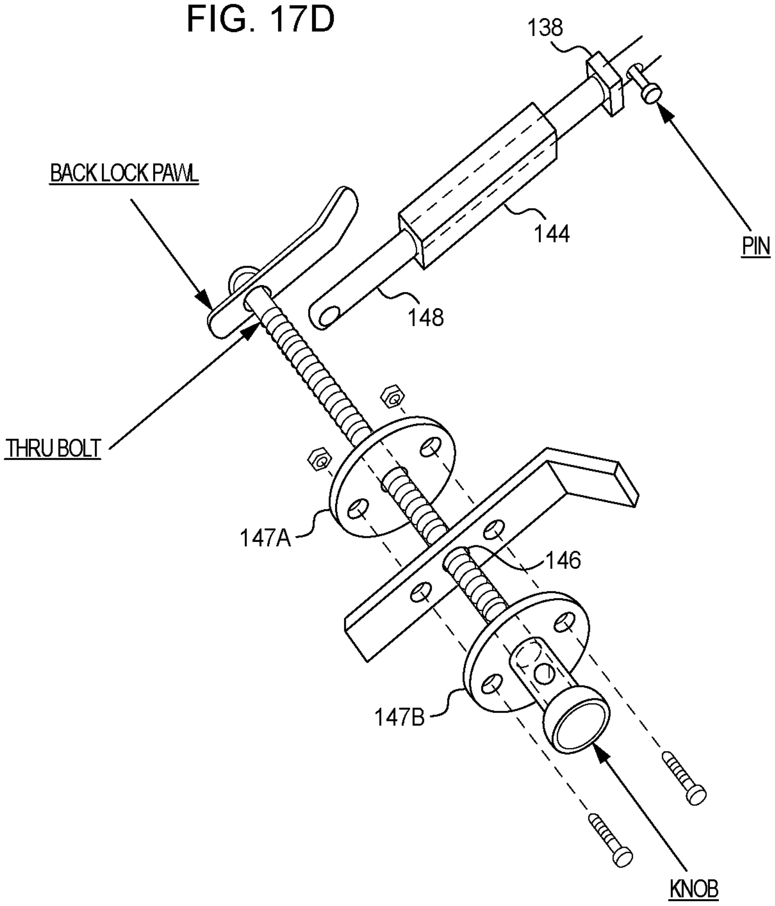
FIG. 17D shows a bracket detail of the doors according to the disclosure.

FIG. 17D shows a bracket detail of the doors according to the disclosure.

Figure 18:
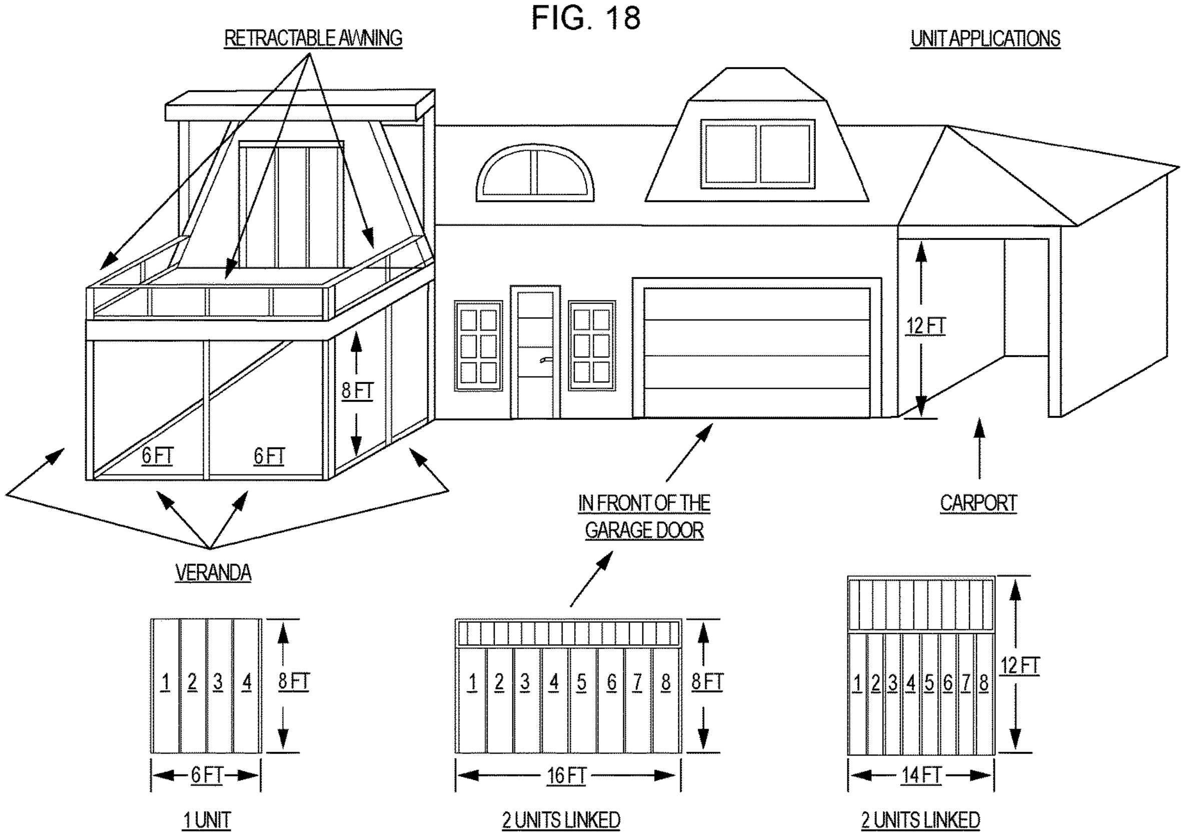
FIGS. 18-20 show the use the product on location.
Figure 19:
Figure 20:
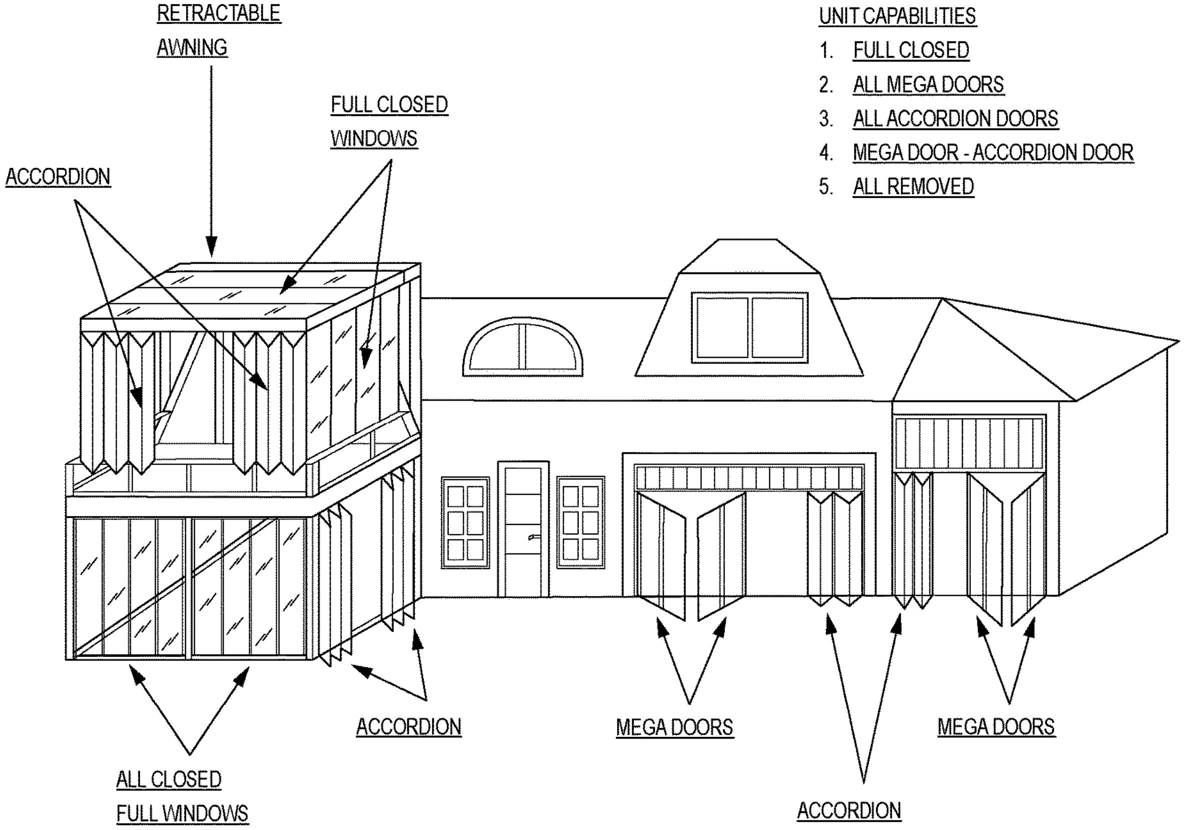

FIGS. 18-20 show the use the product on location.

The methods and systems of the present disclosure, as described above and shown in the drawings provide for a ballistic deflection device with superior properties including increased reliability and ease of use. While the apparatus and methods of the subject disclosure have been showing and described with reference to embodiments, those skilled in the art will readily appreciate that changes and/or modifications may be made thereto without departing from the spirit and score of the subject disclosure.

PARTS LIST

100 secure pin
104A magnet
106 top wheel assemblies
106 top wheel assembly
107 wheel assembly
108 male collar
109 secure pin
110 female rotating cup
111 rotator activator
115 upper hinge assembly
117 top magnet
122 accordion door track wheel assembly frame
122 upper track rail for wheel systems
122 wheel track
123 upper security rod
136 lower quick release bearing
136 connector plate
136 connector plate
138 connector plate
138 connector plate
140 upper corner frame outer larger diameter tube
142 lower hinge
143 lower security pin
144 twist collar
145 upper threaded connector rod to rotator activator
146 handle lever
147A inner sandwich plate
147B outer sandwich plate
148 right hand threaded connector shaft to twist collar
153A rear lock pawl
153B connector fork holder for rear lock pawl 4
154 connector rod to lower guide pin
154 lower guide pin
205 upper cross corner mount for screen/window frame
206 upper corner frame outer larger diameter tube
207A side frame upright
208 inserted section of cross tube
212 inserted section of cross tube 210 into corner tube
214 upper corner mount for screen/window frame
216 upper corner frame outer larger diameter tube
217 inserted section of cross tube 222 into corner tubes
218 top structural cross frame
218 upper corner frame
220 upper mounts for screen/window/frames
222 center cross frame smaller telescopic
224 upper corner frame
226 side mounts screen/window/frames
228 lower corner frame
229 lower screen/window frame mounts
230 inserted section of cross tube 232 into corner tube
232 center cross frame
236 insert section of cross frame 232 into corner frame
240 side mount for screen/window frame
242 lower cross corner screen/window/frame
246 inserted section of cross tube 248 into cross tube 248

250 inner smaller corner tube
252 lower cross corner mount screen/window/frame
253 side fixed length frame
253 structural frame upright
254 edges on threshold
254 lower corner outer frame fixed
255 center long cross tube
256 inserted length
257 lower corner outer frame
258 telescoped side tube
259 upper corner outer frame
259 noted above
262 center long cross tube
264 upper corner outer frame fixed
266 fixed holes for set screws
272 upper bushing for quick release hinges
274 bracket that holds front Accordion door wheel track
276 holes for sequential screen track
276 lower bearing for quick release hinge
278 lower bushing plate
282 secure screws for lower for 278 plate
284 Bottom Threshold with slots for screen door guide fins
285 upper cover adjustable valence
286 connector straps
286 spacer blocks—to lower screen door tops equal with Door tops accordion door tops because of space needed for wheel assemblies 106 on top of accordion doors
288 screen door top wheel assemblies
290 rear stop and cover
294 bottom guide fins on bottom of sequential screen doors
294 guide fins for screen track
296 end stop for sequential screens
296 offset handle which operates both sides
300 slide out rails
300 sequential contacts—front side door 4—note
302 sequential contacts
304 sequential contact
306 screen door tracks
306 sequential contact rear side door
308 sequential contact

What is claimed:

1. An enclosure system, comprising:

a frame configured to be fastened to a base and exterior structure including a plurality of panels including at least a pair of side panels and a front panel;

wherein the front panel comprises a plurality of sliding doors, wherein each of the sliding doors moves along a respective designated track;

wherein the front panel includes a first locking mechanism on a first end, configured to allow each of the sliding doors to be locked in a locked position and allow each of the sliding doors to slide out of the frame in an open position; and wherein each track includes a respective moveable section between a first end and a second end configured to allow each of the sliding doors to be removed or installed between the first end of the track and the second end of the track when the respective moveable section is in an extended position; and wherein adjacent sliding doors are configured to be locked to the frame in a closed position using the first locking mechanism, wherein the first locking mechanism comprises a cylindrical female coupling and a male coupling wherein the cylindrical female coupling is configured to be raised and rotated to allow the male coupling to fit within the female coupling, and a male coupling portion to fit within a j-shaped channel of the cylindrical female coupling, and wherein the rotation is configured to be actuated by a knob located external to the track.

2. The enclosure system of claim 1, wherein the frame, panels, and doors are modularily assembled.

3. The enclosure system of claim 1, wherein the frame is configured to accommodate an increase or decrease of sliding doors.

4. The enclosure system of claim 1, wherein each pair of adjacent sliding doors is configured to be locked to each other in the closed position.

5. The enclosure system of claim 1, wherein the sliding doors are configured to be opened in an accordion manner wherein the pair of adjacent doors are joined and slide together.

6. The enclosure system of claim 1, wherein the sliding doors are configured to be opened in a sliding manner, wherein each door freely travels along the track.

7. The enclosure system of claim 1, wherein the enclosure system is attached to a porch, a mobile home, or a boat deck.

8. The enclosure system of claim 1, further comprising a magnet located on a portion of the frame configured to locate a roller in a desired position when any sliding doors are removed in order to keep the roller in position for reinstallation of the doors.

9. The enclosure system of claim 1, wherein the track fits into the frame.

10. The enclosure system of claim 1, further comprising a respective hinge for securing each of the sliding doors to the frame and configured to be opened manually to remove each of the sliding doors.

* * * * *